US005193354A

United States Patent [19]

Kleinberger et al.

[11] Patent Number: 5,193,354

[45] Date of Patent: Mar. 16, 1993

[54] HUMIDIFICATION SYSTEM WITH DROPLET DISCRIMINATION

[76] Inventors: Itamar Kleinberger, 4367 Dunmore Rd., Marietta, Ga. 30068; John J. Hayman, Jr., 1882 Wicks Valley Dr., Marietta, Ga. 30062

[21] Appl. No.: 830,190

[22] Filed: Jan. 31, 1992

[51] Int. Cl.$^5$ .......... A47F 3/04

[52] U.S. Cl. .......... 62/247; 239/338; 261/78.2

[58] Field of Search .......... 62/247; 55/257.5; 261/78.2; 239/338

[56] References Cited

U.S. PATENT DOCUMENTS

| | | | |
|---|---|---|---|
| 924,500 | 6/1909 | Rush | 261/117 |
| 1,020,937 | 3/1912 | Warwick | 299/58 |
| 1,650,739 | 11/1927 | Ridler | 239/64 |
| 1,673,694 | 6/1928 | McLeod | 299/62 |
| 1,778,141 | 10/1930 | Birdsong et al. | 62/247 X |
| 1,860,600 | 5/1932 | Slaymaker | 299/58 |
| 1,863,914 | 6/1932 | Tyler | 299/58 |
| 1,889,499 | 11/1932 | Rorrer et al. | 261/117 |
| 1,908,968 | 5/1933 | Forman | 261/117 |
| 1,926,651 | 9/1933 | Rombach | 299/58 |
| 1,950,204 | 3/1934 | Wood et al. | 261/117 |
| 1,951,587 | 3/1934 | Tyler | 299/58 |
| 2,011,731 | 8/1935 | Rorrer et al. | 62/89.5 |
| 2,036,446 | 4/1936 | Tsutsumi | 299/87 |
| 2,038,464 | 4/1936 | Wood | 211/127 |
| 2,039,768 | 5/1936 | Bird | 299/62 |
| 2,065,358 | 12/1936 | Zarotschenzeff | 99/194 |
| 2,066,312 | 1/1937 | Bales | 62/89.5 |
| 2,090,326 | 8/1937 | Glattke | 299/58 |
| 2,097,530 | 11/1937 | Peddicord | 62/89.5 |
| 2,263,194 | 11/1941 | Shepherd | 261/30 |
| 2,281,458 | 4/1942 | Schadegg | 62/37 |
| 2,299,046 | 10/1942 | West | 99/154 |
| 2,336,125 | 12/1943 | Preble | 62/170 |
| 2,342,063 | 2/1944 | Sells et al. | 99/168 |
| 2,492,308 | 12/1949 | Menges | 99/194 |
| 2,531,506 | 11/1950 | Geneck | 62/89.5 |
| 2,533,913 | 12/1950 | Booth | 62/89.5 |
| 2,584,650 | 2/1952 | Woodruff | 126/113 |
| 2,625,806 | 1/1953 | Kennedy | 62/89.5 |
| 3,130,024 | 4/1964 | Vaughan, Jr. | 55/257.5 X |
| 3,280,887 | 10/1966 | Charuit et al. | 55/257.5 X |
| 3,561,194 | 2/1971 | Baldwin et al. | 55/257.5 X |
| 3,563,472 | 2/1971 | Skaptason | 239/511 |
| 3,630,448 | 12/1971 | Chapin | 239/111 |
| 3,708,119 | 1/1973 | Vicard | 239/11 |
| 3,788,542 | 1/1974 | Mee | 239/2 |
| 3,843,056 | 10/1974 | Nye | 239/64 |
| 3,990,427 | 11/1976 | Clinebell | 126/113 |
| 4,179,900 | 12/1979 | Corrigan | 62/247 X |
| 4,738,806 | 4/1988 | Noma et al. | 62/247 X |
| 4,808,303 | 2/1989 | Edwards et al. | 62/247 X |

FOREIGN PATENT DOCUMENTS

| | | |
|---|---|---|
| 3313399 | 10/1984 | Fed. Rep. of Germany . |
| 2119501 | 11/1983 | United Kingdom . |

*Primary Examiner*—William E. Tapolcai
*Attorney, Agent, or Firm*—Louis T. Isaf

[57] ABSTRACT

A humidification system for humidifying a controlled space which, in its most preferred embodiment, includes a control device connected to a water source for supplying water at a constant pressure, a tubing network for transferring water from the control device, a mist nozzle located within the controlled space and connected to the tubing network to receive water transferred from the control device, and a droplet discrimination device positioned around the mist nozzle and located within the controlled space for removing and draining larger water droplets from the mist sprayed from the mist nozzle for releasing a very fine water mist into the controlled space outside the droplet discrimination device.

37 Claims, 7 Drawing Sheets

HUMIDIFICATION SYSTEM WITH DROPLET DISCRIMINATION

BACKGROUND OF THE INVENTION

The present invention relates generally to the field of humidity control of a controlled space, and, in its most preferred embodiments, to the field of mist producing humidification systems for refrigerated environments.

The preservation benefits of refrigeration systems are very well known. However, it is also well known that refrigeration systems often extract moisture from the cooled air. As a result, refrigerated perishables, such as meats, fish, salads, flowers, and other products, often dry out and deteriorate in refrigerated display cases. In the past, various efforts have been made to increase humidity levels in refrigerated air. U.S. Pat. Nos. 2,281,458, 4,738,806, 2,531,506, and 2,097,530 disclose several systems claiming to increase humidity levels in refrigerated air.

Although increasing the amount of humidity in refrigerated air can often reduce dehydration of refrigerated perishables, too much humidity in closed cases is also problematic. Humidification systems which produce excessively humid air or, worse yet, spray moisture directly onto refrigerated perishables can cause certain refrigerated perishables to deteriorate more rapidly or become unsaleable.

Accordingly, it is recognized that systems which supply a very fine mist into the refrigerated air are preferable since very small droplets of water tend to evaporate quickly rather than settle and collect on the refrigerated perishables. Many previously developed humidifier systems which produce very fine mists are very complex in construction, operation, and maintenance. Furthermore, many of those systems lend themselves to contamination problems due to incorporation of standing water and various air atomization techniques.

There is, therefore, a need in the industry for a humidification system which solves these and other related, and unrelated, problems.

SUMMARY OF THE INVENTION

Briefly described, the present invention comprises a humidification system for humidifying a controlled space which, in its most preferred embodiment, includes a control device connected to a water source for supplying water at a constant pressure, a tubing network for transferring water from the control device, a mist nozzle located within the controlled space and connected to the tubing network to receive water transferred from the control device, and a droplet discrimination device positioned around the mist nozzle within the controlled space for removing and draining larger water droplets from the mist sprayed from the mist nozzle for releasing a very fine mist into the controlled space outside the droplet discrimination device.

It is therefore an object of the present invention to provide a humidification system for humidifying a controlled space through releasing a very fine mist into the controlled space.

Yet another object of the present invention is to provide a humidification system which is easy to install and maintain in both pre-existing and new refrigerated cases.

Still another object of the present invention is to provide a humidification system which is sanitary and free from contamination problems related to standing water and various air atomization techniques.

Still another object of the present invention is to provide a humidification system which introduces mist into a controlled space in such a form and at such a controlled rate that air within the space remains humid while moisture does not settle on perishables.

Still another object of the present invention is to provide a humidification system which includes a control device connected to a water supply, which control device includes a filter, a high pressure pump, a feedback regulator network for providing constant water pressure, and a timer for controlling misting cycles.

Still another object of the present invention is to provide a humidification system which includes a mist nozzle which emits a mist of separate droplets and a droplet discrimination device which sorts the droplets of the mist emitted from the mist nozzle to sort out and drain larger droplets to release a finer mist.

Still another object of the present invention is to provide a humidification system which includes a mist nozzle, which sprays a fine mist of disconnected water droplets having relatively low exit velocities, and a droplet discrimination device which are both removably located within the refrigerated space of a refrigerated case.

Still another object of the present invention is to provide a humidification system which includes a mist nozzle with a nozzle output orifice for emission of a mist and a droplet discrimination device which defines a mist chamber around the nozzle output orifice, the air in the mist chamber being circulated by mist movement alone.

Still another object of the present invention is to provide a humidification system which includes a mist nozzle with a nozzle output orifice and a droplet discrimination device which completely encloses the nozzle output orifice with the only exception of at least one release aperture located above the nozzle output orifice.

Still another object of the present invention is to provide a humidification system which includes a droplet discrimination device with a base for attachment to a case structure and receipt of a mist nozzle and a removable sleeve for collection of water droplets from the mist.

Still another object of the present invention is to provide a humidification system which includes a droplet discrimination device with a base for attachment to a case structure and receipt of a mist nozzle and a sleeve fixed to the base for collection of water droplets from the mist.

Still another object of the present invention is to provide a humidification system which includes a mist nozzle with an output orifice and a droplet discrimination device with a release aperture, wherein the mist nozzle is located within the droplet discrimination device and oriented to emit mist toward the release aperture.

Other objects, features and advantages of the present invention will become apparent upon reading and understanding this specification, taken in conjunction with the accompanying drawings.

DETAILED DESCRIPTION OF THE PREFERRED EMBODIMENT

Figure 1:
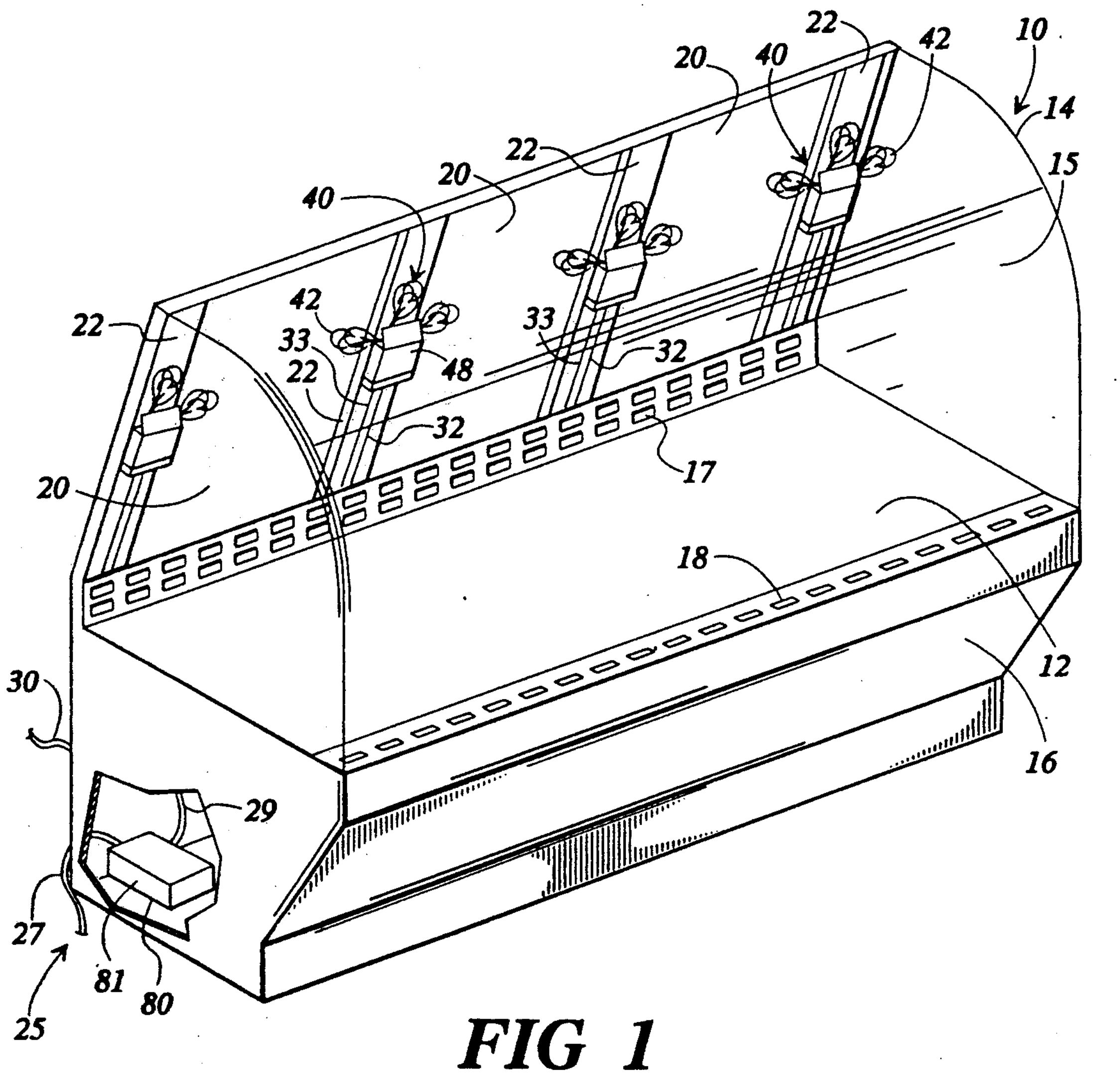
FIG. 1 is a front perspective view of a refrigerated case equipped with a Humidification System With Droplet Discrimination, in accordance with a preferred embodiment of the present invention.

Referring now in greater detail to the drawings, in which like numerals represent like components throughout the several views, the preferred embodiment of a refrigerated case 10 with a Humidification System 25 is shown in FIG. 1. The refrigerated case 10 includes a case base 16 supporting a display surface 12. The display surface 12 is located within a refrigerated space 15 which is enclosed by a glass hood 14 and sliding doors 20 which are supported by support posts 22. Air outlets 17 circulate cool air into the refrigerated space 15, and air intakes 18 remove air from the refrigerated space 15.

Enclosed within the case base 16 is a customary, forced-air refrigeration system (not shown) whose design and operation are considered well-known within the industry. One example of an acceptable refrigerated case 10 is the LCD model manufactured by Tyler Refrigeration Corporation of Niles, Mich. It should be understood that the particular refrigerated case 10 shown in FIG. 1 is shown by way of example only, and that alternately designed refrigerated cases 10 are included in alternate embodiments of the present invention. In one alternate embodiment, a gravity case is utilized which includes cooling coils supported in the upper portion of the refrigerated case 10, thus utilizing convection currents to circulate the cool air. Without limitation, other embodiments include display surfaces 12 which include grated platforms and draining formations for disposing of juices and other droppings from perishables displayed in the refrigerated case 10. In other alternate embodiments of the present invention, refrigerated cases 10 have refrigerated spaces which are not completely enclosed. Furthermore, other alternate embodiments include cases which are cooled with ice rather than refrigeration systems, and still others include cases which are heated, rather than cooled. In still other embodiments, the controlled spaces are neither heated nor cooled but simply need increases in humidity for various purposes.

In accordance with the preferred embodiment of the present invention, the humidification system 25 shown in FIG. 1 includes tap supply hose 27, control assembly 80 which is encased by a protective control box 81 and mounted inside the case base 16, supply main 29, supply tubes 32, mist assemblies 40 which emit fine mist 42, drain tubes 33, and drain main 30. In other alternate embodiments of the present invention, the control assembly 80 is mounted outside the refrigerated case 10. In the preferred embodiment, the tap supply hose 27 is connected to an ordinary utility water outlet. Through conventional tubing connectors and joints (not shown), supply main 29 splits off into several supply tubes 32 which extend into the refrigerated space 15 and are connected to the misting assemblies 40 which are located inside the refrigerated space 15 and mounted to the support posts 22. The drain tubes 33 are also connected to the misting assemblies 40 and extend outside the refrigerated case 10 to connect to the drain main 30 through conventional connectors (not shown). The drain main 30 connects to a standard drainage or sewage system. All of the humidification system tubing running through the refrigerated case 10 is positioned clear from the cold refrigeration elements to prevent freezing of water within the tubing.

It should be understood that the scope of the present invention includes variations in the number and locations of the misting assemblies 40 (and associated supply and drain tubes 32, 33) depending on the size and shape of the refrigerated case 10, as well as other environmental considerations including the types of perishables and placement of the refrigerated case 10. For example, in alternate embodiments, the misting assemblies 40 are mounted on the display surface 12 or angled in alternate directions. With respect to alternate embodiments including alternate cases, the misting assemblies 40 are mounted to various surfaces, including side walls and ceilings. In the preferred embodiment of the present invention, the misting assemblies 40 are vertically aligned, which, at least in part, addresses potential air back-flow concerns.

Figure 2:
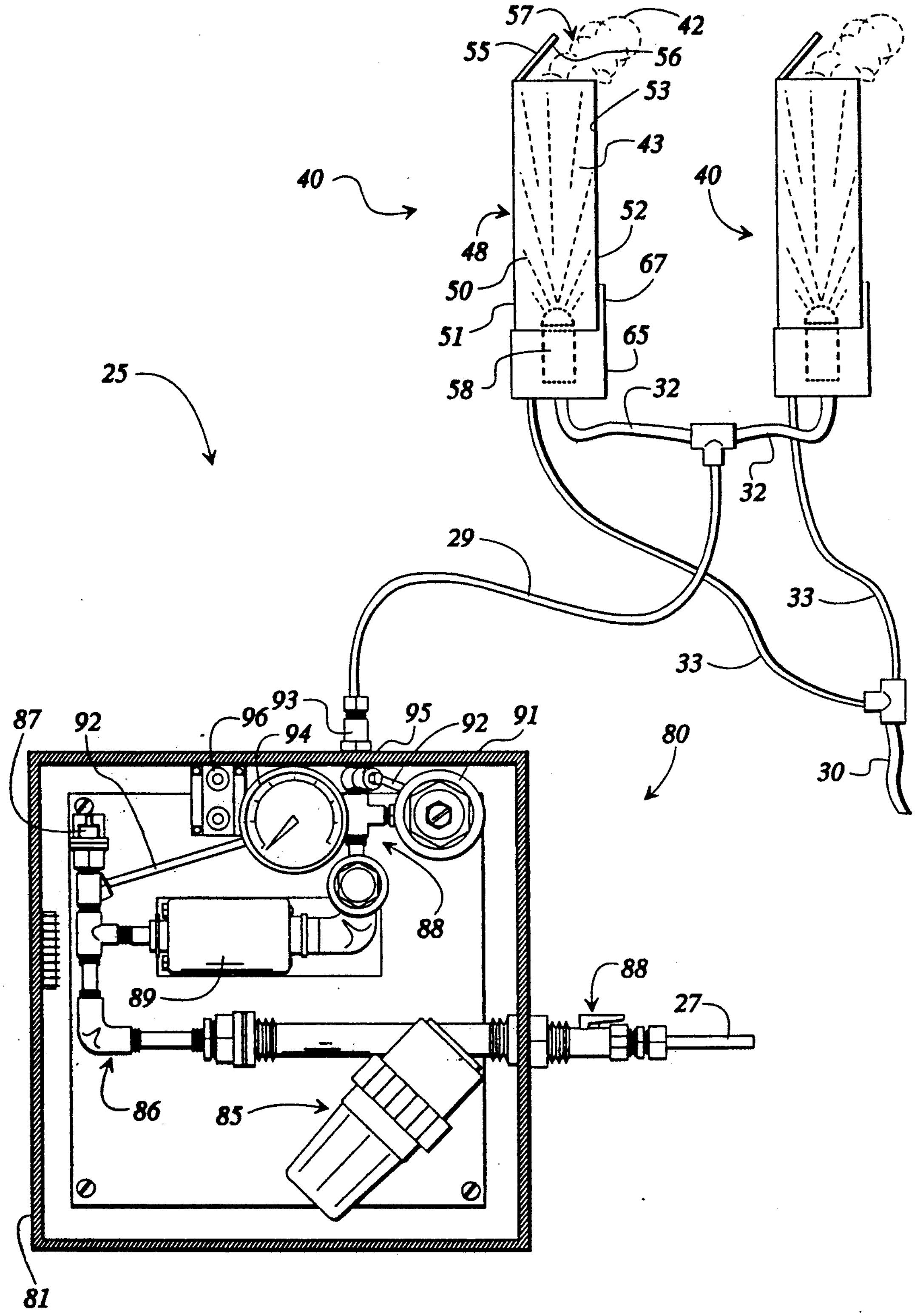
FIG. 2 is a schematic view of the humidification system shown in FIG. 1.

Refer now to the schematic representation of the humidification system 25 shown in FIG. 2. The control box 81 of the control assembly 80 is shown open to reveal the other elements of the control assembly 80 in accordance with the preferred embodiment of the present invention. Tap supply hose 27 is connected to an intake valve assembly 83 which is connected to the control box 81. Connected down-line from the intake valve assembly 83 and located inside the control box 81 is a filter 85. Pre-pump tubing 86 connects the filter 85 to a high pressure pump 89, a supply indicator 87, and a feedback line 92. Post-pump tubing 88 connects the pump 89 to a pressure gauge 94, a pressure regulator 91 which is connected to the feedback line 92, and a control solenoid 95. A supply coupling assembly 93 is connected to the control box 81 and connects the control solenoid 95 to the supply main 29. A timer 96 is also shown mounted within the control box 81.

Figure 2A:
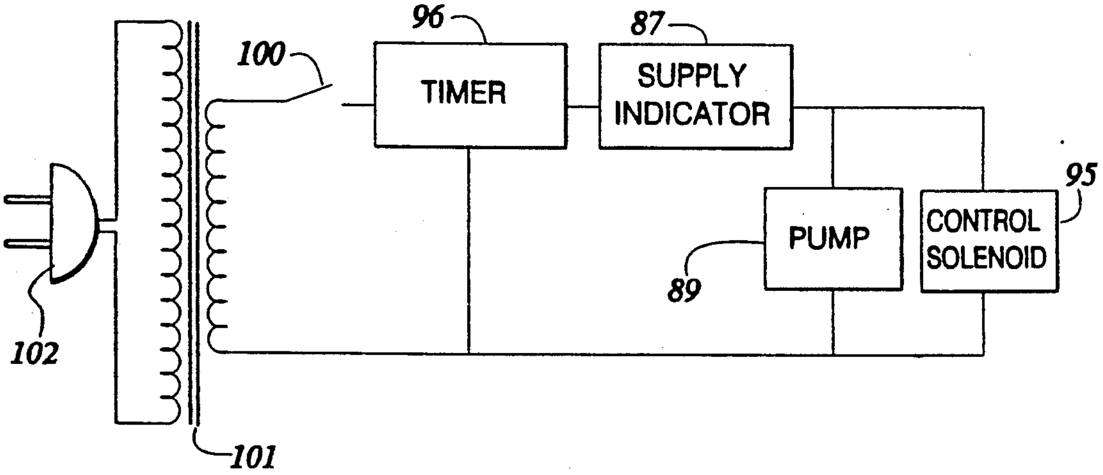
FIG. 2a is an electrical schematic of the control assembly shown in FIG. 2.

Referring now to FIG. 2a, an electrical schematic of the control assembly 80 in accordance with the preferred embodiment of the present invention, an AC plug 102 is shown connected to a transformer 101 which, in the preferred embodiment of the present invention, transforms 110 VAC to 24 VAC. An on-off switch 100 is located between the transformer 101 and the timer 96.

The supply indicator 87 is shown connecting the timer 96 to both the high pressure pump 89 and the control solenoid 95. Operation of the control assembly 80 is discussed in detail below.

Referring back to FIG. 2, in the preferred embodiment of the present invention, the misting assemblies 40 are identical; therefore, although the following description is given in terms of a single misting assembly 40, the description should be understood to apply to each of the misting assemblies 40. In accordance with the preferred embodiment of the present invention, the misting assembly 40 includes a discriminator 48 and a nozzle 58. In the preferred embodiment, the discriminator 48 includes a base 65 and a sleeve 50. The base 65 includes a mounting plate 67 which is removably secured to a support post 22 (shown in FIG. 1). The sleeve 50 includes a sleeve front 51 and a sleeve rear 52 and is removably connected to the base 65 so that the sleeve rear 52 is adjacent the support post 22. The sleeve 50 also includes collection surfaces 53 and a lip 55 which includes a lip bottom 56. The fine mist 42 is seen passing through a release aperture 57.

Figure 3:
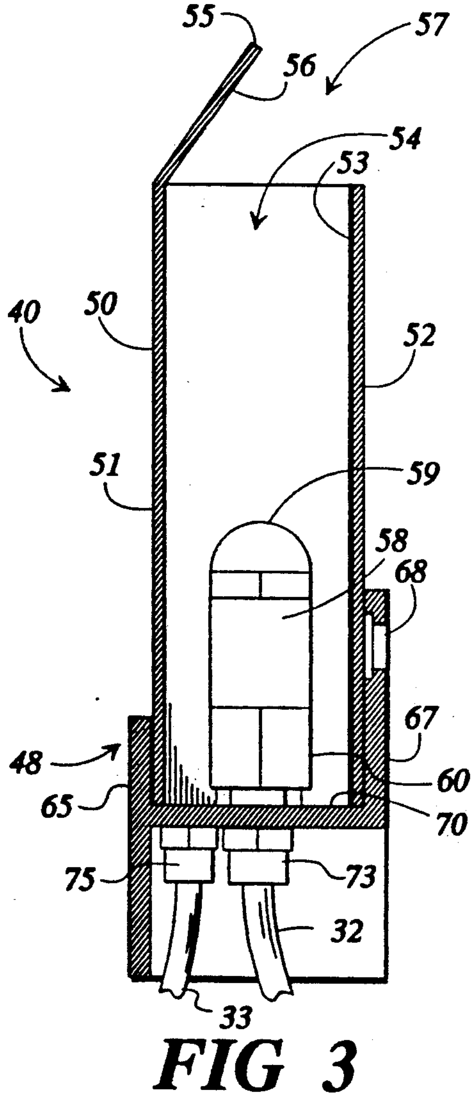
FIG. 3 is a side cross-sectional view of the misting assembly shown in FIG. 1.
Figure 4:
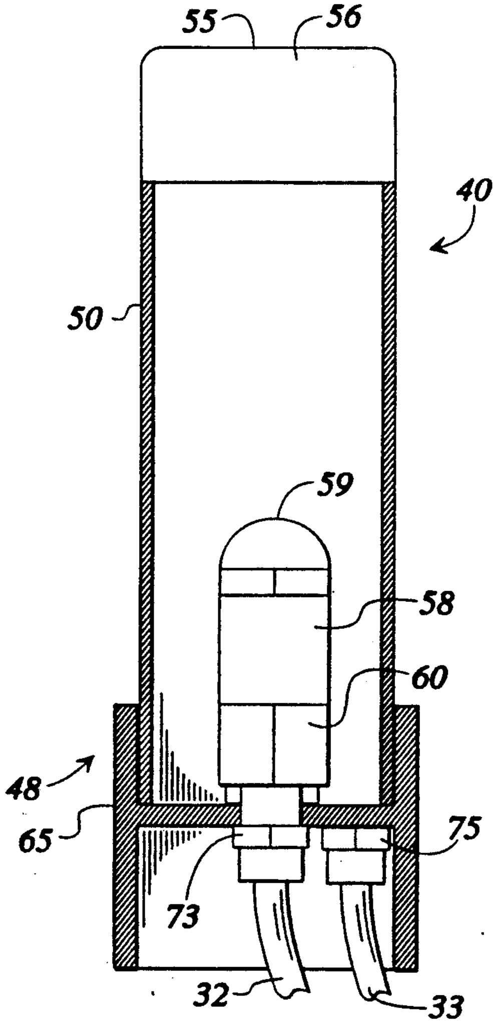
FIG. 4 is a rear cross-sectional view of the misting assembly shown in FIG. 1.

Referring now to FIGS. 3 and 4, which are side and rear cross-sectional views, respectively, of the misting assembly 40 in accordance with the preferred embodiment of the present invention, the misting assembly 40 is shown to further include a nozzle coupling 73 and a drain coupling 75. The base 65 includes a support platform 70 to which the couplings 73, 75 are attached and upon which the sleeve 50 rests. The tubes 32, 33 are also seen connected to the couplings 73, 75, respectively. The nozzle 58 includes a nozzle orifice 59 and a nozzle base 60 which is connected to the nozzle coupling 73. The sleeve 50 is also seen defining a mist chamber 54.

Figure 5:
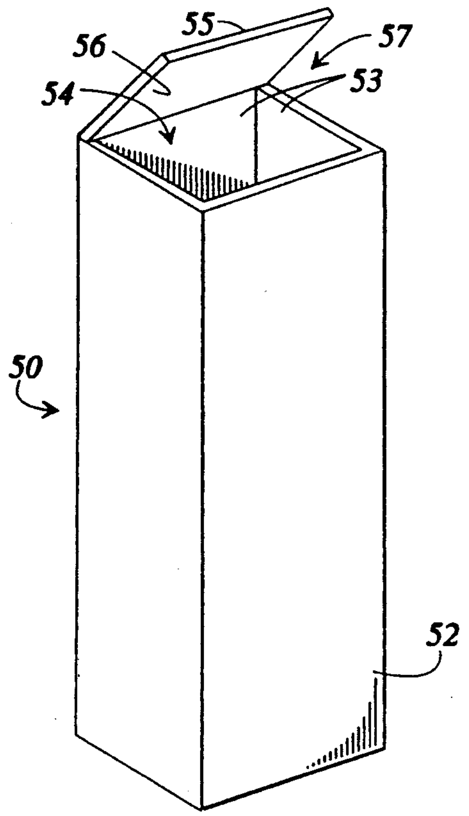
FIG. 5 is a rear perspective view of the sleeve shown in FIG. 2.
Figure 6:
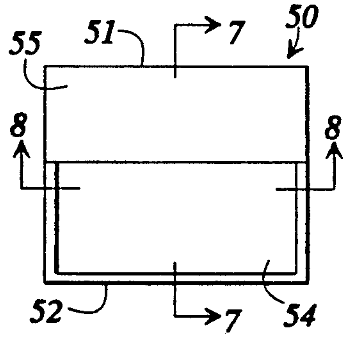
FIG. 6 is a top plan view of the sleeve shown in FIG. 5.
Figure 7:
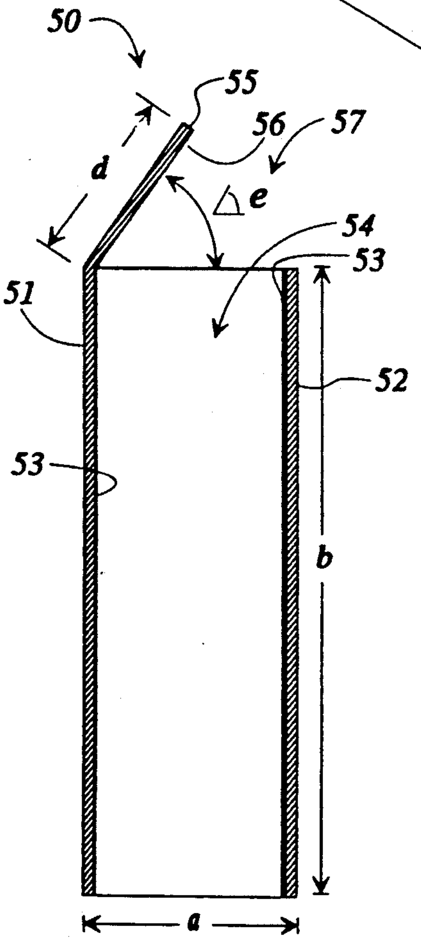
FIG. 7 is a side cross-sectional side view of the sleeve shown in FIG. 6 taken along line 7—7.
Figure 8:
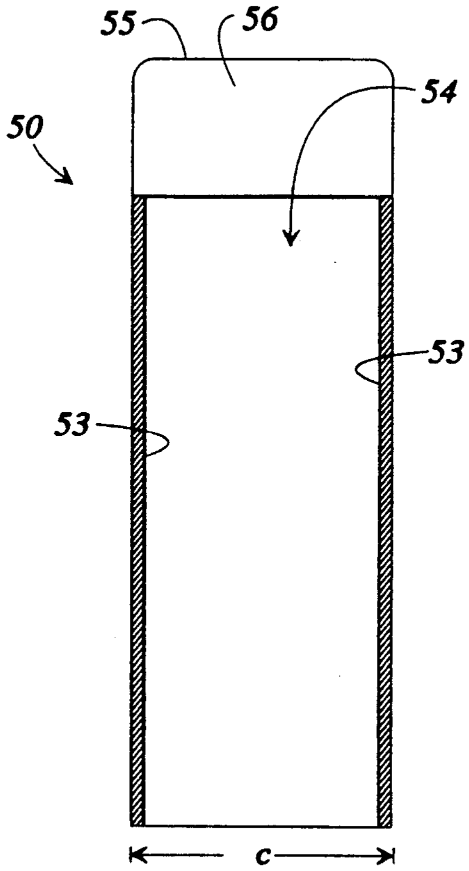
FIG. 8 is a rear cross-sectional view of the sleeve shown in FIG. 6 taken along line 8—8.

FIGS. 5 and 6 show rear perspective and top plan views, respectively, of the sleeve 50 in accordance with the preferred embodiment of the present invention. The sleeve front 51 and sleeve rear 52 are shown along with the lip 55, lip bottom 56, and collection surfaces 53 which border the mist chamber 54. FIG. 7 is a side cross-sectional view of the sleeve 50 taken along line 7—7 of FIG. 6. Lip angle "e" is shown representing the angle made by the lip 55 with the horizontal top of the sleeve 50, and lip length "d" represents the length of lip 55. The height of the mist chamber 54, also indicated as the height of the collection surfaces 53, is represented by dimension "b", and the depth of the mist chamber 54 is represented by dimension "a". FIG. 8 is a rear cross-sectional view of the sleeve 50 taken along line 8—8 of FIG. 6. Dimension "c" represents the width of the mist chamber 54.

Figure 9:
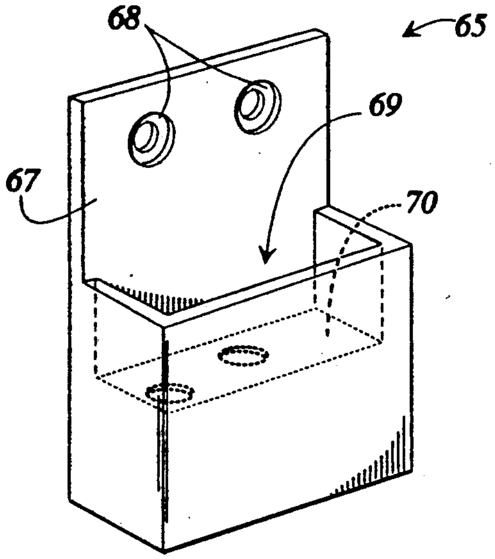
FIG. 9 is a front perspective view of the base shown in FIG. 2.
Figure 10:
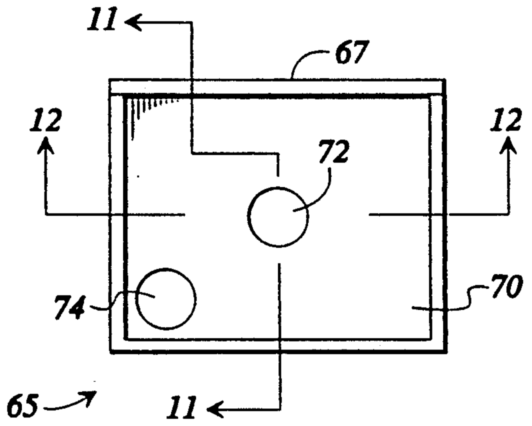
FIG. 10 is a top plan view of the base shown in FIG. 9.
Figure 11:
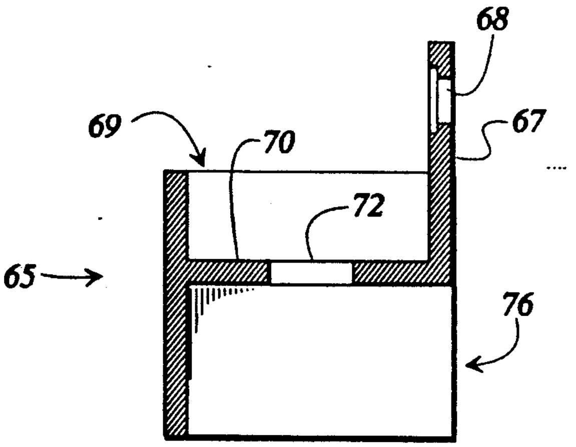
FIG. 11 is a side cross-sectional view of the base shown in FIG. 10 taken along line 11—11.
Figure 12:
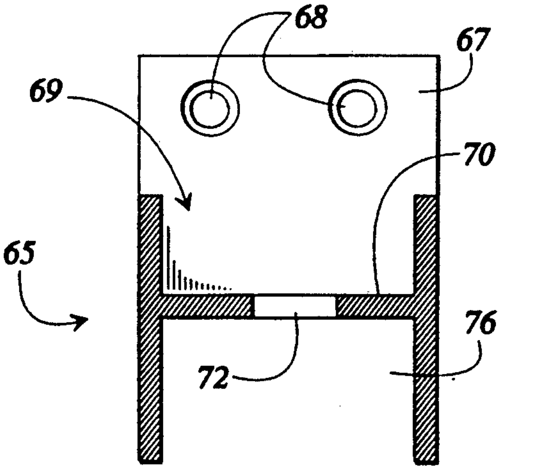
FIG. 12 is a front cross-sectional view of the base shown in FIG. 10 taken along line 12—12.

FIGS. 9 and 10 show front perspective and top plan views, respectively, of the base 65 in accordance with the preferred embodiment of the present invention. The mounting plate 67 is shown including two mounting passages 68 through which screws are placed to secure the base 65 to the support post 22 (shown in FIG. 1). The base 65 is also shown defining a sleeve port 69 for receipt of the sleeve 50 (shown in FIG. 5). A nozzle passage 72 and a drain passage 74 are also seen extending through the support platform 70 for receipt of the nozzle and drain couplings 73, 75, respectively (shown in FIG. 3). FIG. 11 is a side cross-sectional view of the base 65 taken along line 11—11 of FIG. 10. An access passageway 76 is shown extending below the mounting plate 67 from under the support platform 70. In one alternate embodiment of the present invention, the supply and drain tubes 32, 33 are routed through the support post 22 (shown in FIG. 1) and through the access passageway 76. FIG. 12 is a front cross-sectional view of the base 65 taken along line 12—12 of FIG. 10. The nozzle passage 72 is seen extending through the support platform 70 which defines the bottom of the sleeve port 69.

OPERATION

Referring back to FIGS. 1, 2, and 2*a*, water is supplied to the humidification system 25 of the preferred embodiment of the present invention through tap supply hose 27. When the intake valve assembly 83 is closed, water flow is stopped, allowing maintenance or repair on the elements inside the control box 81, such as cleaning the filter 85. When the intake valve assembly 83 is open, water flows through the filter 85 which contains a screen to remove dirt and particulates from the water which could potentially interfere with the operation of other elements of the humidification system 25. One example of an acceptable filter 85 is a conventional 450 mesh screen filter.

In the preferred embodiment of the present invention, the pre-pump tubing 86 supplies water from the filter 85 to the high pressure pump 89 and the supply indicator 87. The supply indicator 87 continually evaluates whether water is being supplied to the high pressure pump 89 by monitoring the water pressure in the pre-pump tubing 86. It is understood that operation of the high pressure pump 89 without a supply of water in the pre-pump tubing 86 may cause damage to the high pressure pump 89. As is shown in FIG. 2*a*, the supply indicator 87 acts as a switch to allow or prevent electrical current flow to the high pressure pump 89 and the control solenoid 95. In the preferred embodiment of the present invention, the supply indicator 87 includes a polyurethane (polyether) diaphragm and has a mechanical contact rating of at least 4 amps for voltages as high as 250 VAC, a proof pressure of 125 psi (pounds per square inch), and a burst pressure of 160 psi. In the preferred embodiment, when water pressure falls below 5 psi, the supply indicator 87 of the preferred embodiment prevents current from flowing to the high pressure pump 89 and the control solenoid 95, thus disabling the high pressure pump 89 and closing the control solenoid 95.

In the preferred embodiment of the present invention, the high pressure pump 89 supplies water to the post-pump tubing 88 at an increased pressure ranging between 130 psi and 250 psi. One example of an acceptable high pressure pump 89 is a pump that will deliver at least 4 gallons per hour at a pressure between 150 psi and 180 psi, operate at 24 volts, and require approximately 5 amps. Other alternate embodiments of the present invention include pumps supplying higher or lower pressures.

The pressure gauge 94 continually measures and indicates the water pressure in the post-pump tubing 88 to enable a human operator to monitor the water pressure. According to the preferred embodiment of the present invention, the pressure regulator 91 and the feedback line 92 operate as a feedback regulator network which attempts to maintain the water pressure in the post-pump tubing 88 at a pre-selected pressure, regardless of the number of misting assemblies 40 contained in the humidification system 25. In this way, one or more misting assemblies 40 may be added to or removed from the humidification system 25 while not affecting the water pressure to each of the misting assemblies 40.

Since the amount of water pressure affects the quality of mist emitted from the mist nozzles 58, the pressure regulator 91 and the feedback line 92 help to ensure optimum mist quality.

In the preferred embodiment of the present invention, the pressure regulator 91, often referred to in the industry as a back pressure valve, is designed to, on a continuous or intermittent basis, limit the desired maximum pressure by releasing water into a lower pressure line or area. Back pressure valves, when properly sized, open and close at predetermined points to provide accurate, functional control for continuous protection of pumps and delivery of desired pressures. In the preferred embodiment of the present invention, the pressure regulator 91 is capable of controlling pressures at flow rates as low as 0.4 gallons per hour and as high as 6 gallons per hour at 150 psi.

The control solenoid 95 is a normally closed, electrically-controlled valve which is either open in both directions or closed in both directions. One example of an acceptable control solenoid 95 is a direct acting, 24 VAC valve which operates effectively with water pressures ranging up to 200 psi. Among other functions, the control solenoid 95 selectively prevents water from continuously flowing through the control assembly 80 since, in the preferred embodiment, water would otherwise flow through the high pressure pump 89 due to water pressure from the utility outlet.

In addition to being controlled by supply indicator 87, operation of both the control solenoid 95 and the high pressure pump 89 is controlled by the timer 96. The timer 96 is selectively programmable to a variety of on/off cycle combinations. One example of an acceptable timer 96 is a repeat cycle timer having a relay output rated at 10 amps, a dual input voltage capability (110 VAC or 24 VAC), a multi-timing range of 0.1 second to 10 hours, an "on" dial for setting the amount of "on" time, and an "off" dial for setting the amount of "off" time.

In the preferred embodiment of the present invention, the timer 96 is programmed to both open the control solenoid 95 and operate the high pressure pump 89 for a period of 0.7 seconds to cause water to be pumped at a high pressure through the supply coupling assembly 93 and the supply main 29. This "on" period is followed by an "off" period of 2 seconds when the control solenoid 95 is closed and the high pressure pump 89 is inactive. The timer 96 alternates between these "on" and "off" periods continuously. It should be understood that these "on" and "off" times are selectively variable, depending, at least in part, on the type of product and amount of air being humidified.

As highly pressurized water is supplied to the supply main 29, the water is transferred from the control assembly 80 on a path through both the supply main 29 and the supply tubes 32 to the misting assemblies 40. In the preferred embodiment of the present invention, the high pressure pump 89 also functions as a check valve to prevent water from flowing in the reverse direction from the post-pump tubing 88 to the pre-pump tubing 86. Therefore, when the control solenoid 95 is closed, the water pressure within the post-pump tubing 88 remains relatively constant. However, immediately after the control solenoid 95 is closed, the water pressure in the supply main 29 and the supply tubes 32 begins to fall off since the misting assemblies 40 remain open. When the timer 96 again opens the control solenoid 95, the water pressure in the supply main 29 and the supply tubes 32 is returned to the optimum pressure during the initial portion of the "on" cycle. The amount of water pressure lost during the "off" cycle depends, at least in part, on the length of the "off" cycle and the number of misting assemblies 40.

Referring also to FIGS. 3 and 4, as the pressurized water reaches the misting assembly 40 through the supply tube 32, the water travels through the nozzle coupling 73 and into the nozzle base 60 of the mist nozzle 58. The water travels through the mist nozzle 58 and is sprayed from the nozzle orifice 59 into the mist chamber 54 as nozzle mist 43, a mist of separate and independent water droplets travelling in a nozzle-specific spray pattern. In the preferred embodiment of the present invention, water droplets of the nozzle mist 43 vary in size from approximately 5 microns to over 60 microns. One example of an acceptable mist nozzle 58 sprays mist in a 45-degree conical spray pattern at a rate of 0.4 gallons per hour when receiving water at a pressure of 150 psi. It is understood that the pressure of the water supplied to the mist nozzle 58 affects the size of the water droplets of the nozzle mist 43, thus the water pressure is preferably maintained within an optimum range during the "on" period to induce emission of the finest possible nozzle mist 43. This optimum range of pressure for the preferred mist nozzle 58 includes pressures greater than 120 psi.

As the water droplets in the nozzle mist 43 travel away from the nozzle orifice 59, the size, weight, and initial direction of travel of each water droplet determines, at least in part, the droplet's destiny. In the preferred embodiment of the present invention, most of the larger water droplets tend to come into contact with the collector surfaces 53 or the lip bottom 56 of the sleeve 50. Upon making contact, the larger water droplets adhere to the collector surfaces 53 or the lip bottom 56, or are otherwise impeded from upward movement, whereas the lighter water droplets tend to float upward and outward through the release aperture 57 of the sleeve 50 to be released as the fine mist 42. The fine mist 42 is composed of water droplets which are sufficiently small, typically ranging between 1 and 20 microns in the preferred embodiment of the present invention, to evaporate before contacting perishables contained within the refrigerated case 10. It is a goal of the preferred embodiment of the present invention to coordinate, without limitation, droplet size, droplet speed, droplet weight, droplet initial direction of travel, shape and size of discriminator 48, and location and orientation of mist nozzle 58 to minimize the possibility that larger droplets will exit the release aperture 57 as part of the fine mist 42.

As the larger water droplets continue to collect on the collector surfaces 53 of the sleeve 50, they begin to accumulate and drain downward toward the support platform 70 of the base 65. The draining water then passes through the drain coupling 75, the drain tube 33, and the drain main 30 to a point outside the refrigerated case 10.

In addition to the size, speed, emission rate, and initial direction of travel of the water droplets emitted from the mist nozzle 58, all of which are determined, in part, by the water pressure and type of mist nozzle 58, the shape and dimensions of the discriminator 48 of the preferred embodiment of the present invention affect the fine mist 42 which is released into the refrigerated space 15 and provide control over the distribution of moisture into the refrigerated space 15. In the present invention, the discriminator 48 is so constructed that air within the mist chamber 54 moves primarily in response to movement of the nozzle mist 43 as it exits the mist nozzle 58. The depth "a", height "b", and width "c" of the mist chamber 54, as well as the lip length "d" and lip angle "e" (shown in FIGS. 7 and 8), all affect the amount and average droplet size of the fine mist 42. The lip length "d" and lip angle "e" also affect the direction taken by the fine mist 42 as it exits the release aperture 57. Examples of acceptable dimensions of an acceptable discriminator 48, which dimensions correspond to the above-disclosed acceptable examples of other elements, are as follows: depth "a"=1 inch; height "b"=6 inches; width "c"=2 inches; lip length "d"=1 inch; and lip angle "e"=60 degrees.

The position and orientation of the mist nozzle 58 also affect various qualities of the mist released from the misting assembly 40. In the preferred embodiment of the present invention, the mist nozzle 58 is located below the release aperture 57 at the bottom of the mist chamber 54 and is oriented so that the nozzle orifice 59 faces the release aperture 57. As the nozzle mist 43 is emitted from the nozzle orifice 59, the initial directions taken by the droplets of the nozzle mist 43 aid in the migration of the smaller droplets which eventually form the fine mist 42. In other words, in the preferred embodiment of the present invention, the initial direction taken by each of the droplets of the nozzle mist 43 includes a vector component of direction toward the release aperture 57.

The construction of the misting assembly 40 also accommodates maintenance concerns. In the preferred embodiment of the present invention, the discriminator 48 is composed of stainless steel and is easily disassembled and removed from the refrigerated case 10 for ease of cleaning.

ALTERNATE EMBODIMENTS

It is intended that the scope of the present invention include various alternate embodiments. However, it should also be understood that the each of the embodiments disclosed herein, including the preferred embodiment, includes features and characteristics which are considered independently inventive. Accordingly, the disclosure of variations and alterations expressed in alternate embodiments is intended only to reflect on the breadth of the scope of the present invention without rendering obvious or unimportant any of the specific features and characteristics of the preferred embodiment.

Figure 13:
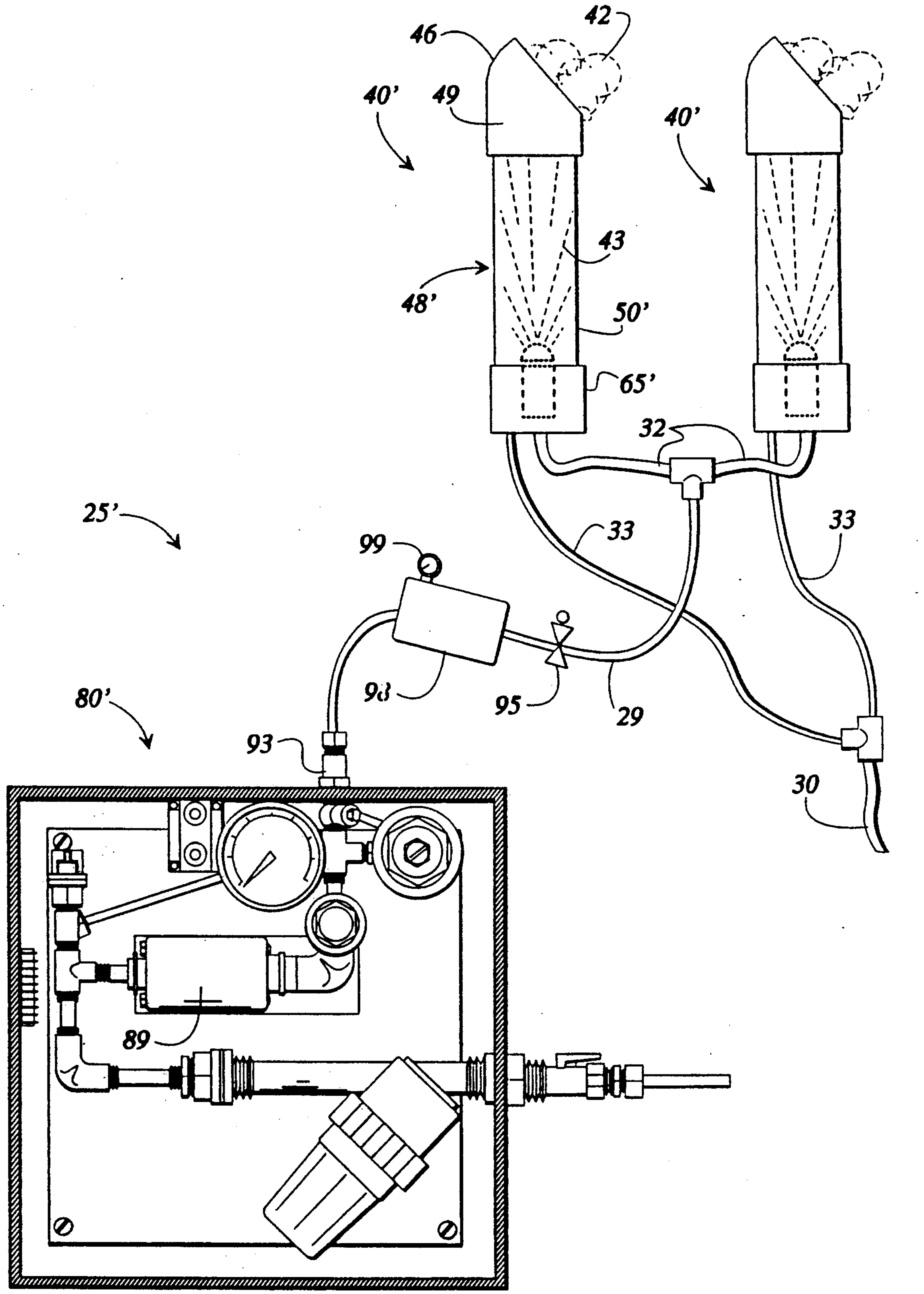
FIG. 13 is a schematic view of a humidification system in accordance with an alternate embodiment.
Figure 14:
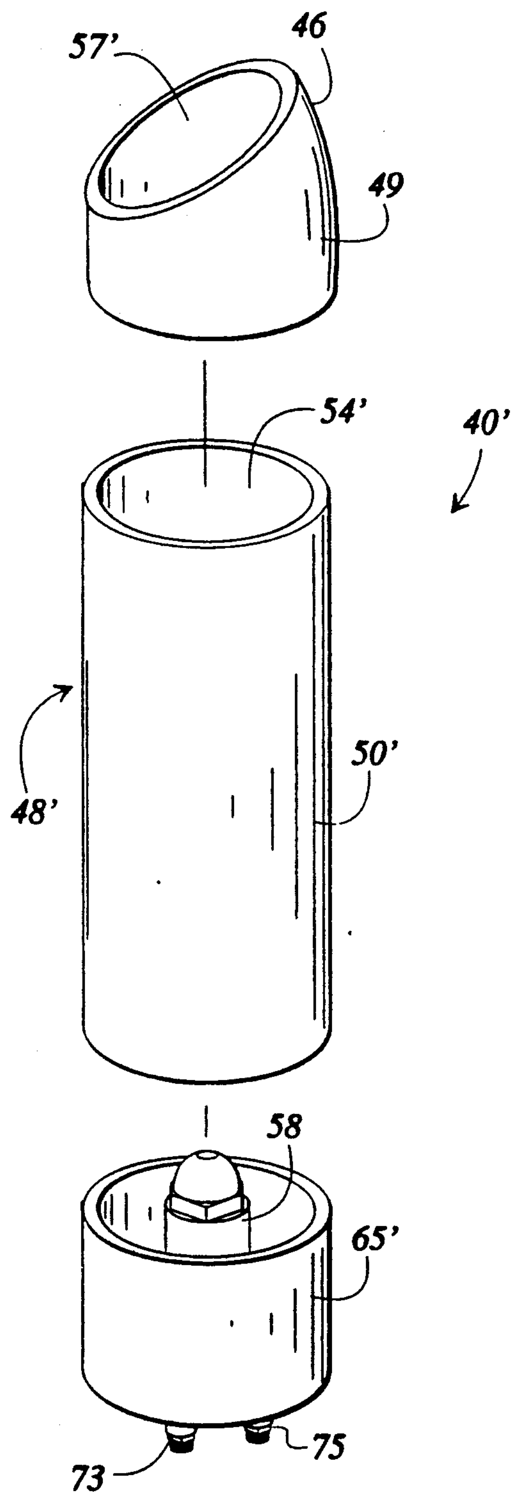
FIG. 14 is an exploded perspective view of the misting assembly shown in FIG. 13.

A first alternate embodiment of the present invention is represented by FIGS. 13 and 14. FIG. 13 is a schematic view of a humidification system 25' in accordance with an alternate embodiment of the present invention, and FIG. 14 is an exploded perspective view of the misting assembly 40' shown in FIG. 13. An alternate control assembly 81' includes a high pressure water tank 98 with a tank pressure sensor 99. In addition, the control solenoid 95 is located down-line from both the supply coupling assembly 93 and the high pressure water tank 98.

The alternate control assembly 81' operates similarly to the preferred embodiment in many respects. However, operation of the high pressure pump 89 is controlled, at least in part, by the tank pressure sensor 99. When water pressure in the high pressure water tank 98 decreases below a predetermined level, the high pressure pump 89 is activated to increase the water pressure. Use of the high pressure water tank 98 provides the present invention with a means for more rapidly returning the water pressure in the supply main 29 and supply tubes 32 to optimum levels during the initial portion of each "on" period, discussed in more detail above. Consequently, water is supplied to the misting assemblies 40' at optimum pressures for a greater percentage of each "on" period. In another alternate embodiment of the present invention, (not shown) a control solenoid 95 is located at each misting assembly 40' to replace the single control solenoid 95 located at the high pressure water tank 98. In such an embodiment, water is supplied to the misting assemblies 40' at optimum pressures for an even greater percentage of each "on" period.

The alternately shaped misting assemblies 40' are another variation from the preferred embodiment of the present invention. FIG. 14 shows that the misting assembly 40' includes a right circular cylindrical discriminator 48'. A cylindrical sleeve 50' is connected to a cylindrical base 65' and a sleeve cap 49 which includes a cap director 56 and defines a circular release aperture 57' and a cylindrical mist chamber 54'. As with the preferred embodiment of the present invention, the mist nozzle 58 is connected to the nozzle coupling 73 which is connected to the base 65' along with the drain coupling 75. The cap director 46, like the lip 55 of the preferred embodiment shown in FIG. 2, aids in collecting larger water droplets and selectively directing the fine mist 42 released through the release aperture 57'.

The present invention is also considered to include other alternately shaped discriminators 48'. In other alternate embodiments of the present invention, discriminators 48' define unitary structures of various compositions, define mist chambers 54' of various shapes and sizes, include one or more alternately shaped release apertures 57', and include alternate draining paths. Alternately shaped discriminators include discriminators having various cross-sectional shapes such as triangles, squares, hexagons, pentagons, hexagons, ovals, etc. Furthermore, other discriminators 48' include adjustable release apertures 57' and mist directing devices such as the lip 55 and the cap director 46.

Although the scope of the present invention is understood to include many variously shaped discriminators in alternate embodiments, the inventiveness of various features of the discriminator 48 of the preferred embodiment is not limited by inclusion of such alternate embodiments. Without limitation, several of these features include selection of specific dimensional features such as the length "b" of the discriminator 48, the enclosing, "wrap-around" shape of the discriminator 48, and the location and orientation of the mist nozzle 58 with respect to the release aperture 57.

It should also be understood that other mist nozzles 58 included within the scope of the present invention require alternate amounts of water pressure to emit the finest mist available from the alternate mist nozzles 58, thus it should be understood that alternate high pressure pumps 89 or pressure regulators 91 should accordingly be substituted, or appropriate adjustments should be made to the preferred pressure regulator 91, to accommodate alternate mist nozzles 58.

It should also be understood that the each of the variations from the preferred embodiment of the present invention discussed in relation to the alternate embodiments of the present invention are separate and distinct. All combination of the variations are considered to be within the scope of the present invention.

While the embodiments of the present invention which have been disclosed herein are the preferred forms, other embodiments of the apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby.

I claim:

1. A refrigeration apparatus comprising:
 a refrigerated case means defining an enclosed refrigerated space for storing perishables;
 a humidifier means for maintaining the refrigerated space at a selective humidity level, said humidifier means including, at least,
  a control means connected to a water source for supplying water at a constant pressure for a selective amount of time,
  a tubing means for transferring water from said control means,
  a mist nozzle means located entirely within the refrigerated space and connected to said tubing means to receive water transferred from said control means for misting a spray of disconnected water droplets, and
  a droplet discrimination means located adjacent said mist nozzle means and within the refrigerated space for collecting larger water droplets emitted from said mist nozzle means to release a very fine mist of water droplets into the refrigerated space outside said discrimination means,
  wherein said droplet discrimination means is so constructed that air within said droplet discrimination means moves primarily in response to the motion of the water droplets emitted from said mist nozzle means.

2. Apparatus of claim 1, wherein said control means includes, at least a filter means for removing particulates from water received from the water source, a pump means for pressurizing water flowing from said control means, and a timer means for controlling water supply cycles.

3. Apparatus of claim 2, wherein said control means further includes, at least, a feedback valve means for maintaining water pressure at a predetermined pressure regardless of mist nozzle availability.

4. Apparatus of claim 2, wherein said control means further includes, at least, a pressure sensor means operatively connected to said pump means, for sensing water supplied to said pump means.

5. Apparatus of claim 1, wherein said humidifier means further includes, at least, a drainage means for draining water away from said droplet discrimination means to a location outside said case means.

6. Apparatus of claim 1, wherein said mist nozzle means mists a spray of water droplets whose median micron size is less than 100.

7. Apparatus of claim 1, wherein said droplet discrimination means includes, at least, a housing which includes, at least, a plurality of interior collection surfaces positioned to collect larger water droplets from the air adjacent said mist nozzle means.

8. Apparatus of claim 7, wherein said housing further includes, at least, a mist release means for allowing very fine mist to enter the refrigerated space outside said droplet discrimination means.

9. Apparatus of claim 8, wherein said mist release means includes at least one aperture located above said mist nozzle means.

10. Apparatus of claim 8, wherein said mist nozzle means is oriented to substantially face said mist release means.

11. Apparatus of claim 8, wherein said mist nozzle means is so oriented that at least a portion of droplets emitted from said mist nozzle means have initial directions which include directional components oriented toward said mist release means.

12. Apparatus of claim 8, wherein said housing of said droplet discrimination means further includes, at least, a drainage access portal and a nozzle supply portal, and wherein said humidifier means further includes, at least, a drainage means connected to said drainage access portal for draining water away from said droplet discrimination means.

13. Apparatus of claim 12, wherein said mist nozzle means includes, at least, a nozzle outlet orifice, and wherein, except for said mist release means, said drainage access portal, and said nozzle supply portal, said housing completely encloses said nozzle outlet orifice.

14. Apparatus of claim 1, wherein said droplet discrimination means includes, at least,
 a base means connected to said case means for supporting said mist nozzle means, and
 a sleeve means removably connected to said base means for collecting larger water droplets emitted from said mist nozzle means.

15. Apparatus of claim 14, wherein said base means includes, at least,
 a fastening means for connection to said case means,
 a nozzle connection means for receipt of said mist nozzle means, and
 a drainage means for directing water away from said droplet discrimination means.

16. Apparatus of claim 15, wherein said fastening means is adaptable for being located in various locations throughout the refrigerated space.

17. Apparatus of claim 14, wherein said sleeve means includes, at least, a plurality of interior collection surfaces for removing larger water droplets from the air adjacent said mist nozzle means.

18. Apparatus of claim 14, wherein said sleeve means further includes, at least, a mist release means for allowing very fine mist to enter the refrigerated space outside said droplet discrimination means.

19. Apparatus of claim 18, wherein said mist release means includes at least one aperture located above said mist nozzle means.

20. A humidification apparatus for humidifying a controlled space defined by a control structure, said humidification apparatus comprising:
 a control means connected to a water source for supplying water at a constant pressure;
 a tubing means for transferring water from said control means;
 a mist nozzle means located entirely within the controlled space and connected to said tubing means to receive water transferred from said control means for misting a spray of disconnected water droplets; and a droplet discrimination means located adjacent said mist nozzle means and within the controlled space for collecting larger water droplets emitted from said mist nozzle means to release a very fine mist of water droplets into the controlled space outside said discrimination means, wherein aid droplet discrimination means is so constructed that air within said droplet discrimination means moves primarily in response to the motion of the water droplets emitted from said mist nozzle means.

21. Apparatus of claim 20, wherein said control means includes, at least, a filter means for removing particulates from water received from the water source, a pump means for pressurizing water flowing from said control means, and a timer means for controlling water supply cycles.

22. Apparatus of claim 21, wherein said control means further includes, at least, a feedback valve means for maintaining water pressure at a predetermined pressure regardless of mist nozzle availability.

23. Apparatus of claim 20, wherein said humidifier means further includes, at least, a drainage means for draining water away said droplet discrimination means.

24. Apparatus of claim 20, wherein said droplet discrimination means includes, at least, a housing with a plurality of interior collection surfaces for removing larger water droplets from the air adjacent said mist nozzle means, and a mist release means for allowing very fine mist to enter the controlled space outside said droplet discrimination means, said mist release means including at least one aperture located above said mist nozzle means.

25. Apparatus of claim 20, wherein said droplet discrimination means includes, at least, a base means for connection to the control structure for supporting said mist nozzle means, said base means including, at least, a fastening means for connection to said control structure, a nozzle connection means for receipt of said mist nozzle means, and a drainage means for directing water away from said droplet discrimination means, and a sleeve means removably connected to said base means for collecting larger water droplets emitted from said mist nozzle means, said sleeve means including, at least, a plurality of interior collection surfaces for removing larger water droplets from the air adjacent said mist nozzle means, and a mist release means for allowing very fine mist to enter the controlled space outside said droplet discrimination means, said mist release means including at least one aperture located above said mist nozzle means.

26. A droplet discrimination apparatus for use with a mist nozzle of a humidification system to remove and drain larger droplets from the mist emitted from the mist nozzle to release a finer mist into a controlled spaced defined by a control structure, said droplet discrimination apparatus comprising:

a housing defining a mist chamber partially enclosed by a plurality of collection surfaces;

a nozzle receipt portal; and a mist release aperture located above said nozzle receipt portal, wherein said droplet discrimination means is so constructed that air within said droplet discrimination means moves primarily in response to the motion of the water droplets emitted from said mist nozzle means.

27. Apparatus of claim 26, further comprising a base section including, at least, a fastening means for connection to the control structure, and a drainage means for directing collected droplets away from said control structure.

28. Apparatus of claim 26, wherein said nozzle receipt portal and said mist release aperture are positioned and oriented to receive a mist nozzle substantially facing the mist release aperture.

29. Method of humidifying a controlled space, said method comprising the steps of:

supplying water to a mist nozzle at a predetermined pressure;

emitting a mist of water droplets from the mist nozzle;

collecting larger droplets of water from the mist with a sleeve at least partially surrounding the mist nozzle, wherein air within the sleeve moves primarily in response to movement of the mist of water droplets emitted from the mist nozzle; and releasing a very fine mist through an opening in the sleeve and into the controlled space.

30. Method of claim 29, wherein said predetermined pressure defines a pressure between 130 and 250 pounds per square inch, and wherein the water droplets define sizes less than 100 microns.

31. Method of claim 29, further including the steps of discontinuing supplying water to the mist nozzle after a predetermined period of "on" time and for a predetermined period of "off" time, and repeating the above steps in a cyclic fashion.

32. Method of claim 29, wherein the emitting step includes, at least, directing small droplets toward the opening in the sleeve.

33. A refrigeration apparatus comprising:

a refrigerated case means defining an enclosed refrigerated space for storing perishables;

a humidifier means for maintaining the refrigerated space at a selective humidity level, said humidifier means including, at least, a control means connected to a water source for supplying water at a constant pressure of at least 120 pounds per square inch for a selective amount of time, a tubing means for transferring water from said control means, a mist nozzle means located entirely within the refrigerated space and connected to said tubing means to receive water transferred from said control means for misting a spray of disconnected water droplets, and a droplet discrimination means located adjacent said mist nozzle means and within the refrigerated space for collecting larger water droplets emitted from said mist nozzle means to release a very fine mist of water droplets into the refrigerated space outside said discrimination means.

34. A humidification apparatus for humidifying a controlled space defined by a control structure, said humidification apparatus comprising:

a control means connected to a water source for supplying water at a constant pressure of at least 120 pounds per square inch;

a tubing means for transferring water from said control means, a mist nozzle means located entirely within the controlled space and connected to said tubing means to receive water transferred from said control means for misting a spray of disconnected water droplets; and a droplet discrimination means located adjacent said mist nozzle means and within controlled space for collecting larger water droplets emitted from said mist nozzle means to release a very fine mist of water droplets into the controlled space outside said discrimination means.

35. Method of humidifying a controlled space, said method comprising the steps of:

supplying water to a mist nozzle at a pressure of at least 120 pounds per square inch;

emitting a mist of water droplets from the mist nozzle;

collecting larger droplets of water from the mist with a sleeve at least partially surrounding the mist nozzle; and releasing a very fine mist through an opening in the sleeve and into the controlled space.

36. A refrigeration apparatus comprising:

a refrigerated case means defining an enclosed refrigerated space for storing perishables;

a humidifier means for maintaining the refrigerated space at a selective humidity level, said humidifier means including, at least, a control means connected to a water source for supplying water at a constant pressure for a selective amount of time, a tubing means for transferring water from said control means, a mist nozzle means located entirely within the refrigerated space and connected to said tubing means to receive water transferred from said control means for misting a spray of disconnected water droplets, and a droplet discrimination means located adjacent said mist nozzle means and within the refrigerated space for collecting larger water droplets emitted from said mist nozzle means to release a very fine mist of water droplets into the refrigerated space outside said discrimination means, said droplet discrimination means including at least, a housing defining a mist chamber partially enclosed by a plurality of collection surfaces, a nozzle receipt portal, a mist release aperture located above said nozzle receipt portal, and a drainage aperture, wherein, except for said nozzle receipt portal, said mist release aperture, and said drainage aperture, said housing defines an enclosed space.

37. A droplet discrimination apparatus for use with a mist nozzle of a humidification system to remove and drain larger droplets from the mist emitted from the mist nozzle to release a finer mist into a controlled spaced defined by a control structure, said droplet discrimination apparatus comprising:

a housing defining a mist chamber partially enclosed by a plurality of collection surfaces;

a nozzle receipt portal;

a mist release aperture located above said nozzle receipt portal, and a drainage aperture, wherein except for said nozzle receipt portal, said mist release aperture, and said drainage aperture, said housing defines an enclosed space.

* * * * *